United States Patent
Carroll et al.

(10) Patent No.: US 11,847,412 B2
(45) Date of Patent: Dec. 19, 2023

(54) ENFORCING DATA OWNERSHIP AT GATEWAY REGISTRATION USING NATURAL LANGUAGE PROCESSING

(71) Applicant: Capital One Services, LLC, McLean, VA (US)

(72) Inventors: Christian Carroll, Frisco, TX (US); Madhav Ayyagari, Frisco, TX (US); Terrence Mower, Plano, TX (US); Amit Pandey, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 281 days.

(21) Appl. No.: 17/463,917

(22) Filed: Sep. 1, 2021

(65) Prior Publication Data
US 2023/0064770 A1  Mar. 2, 2023

(51) Int. Cl.
*G06F 40/279* (2020.01)
*G06F 9/54* (2006.01)
(Continued)

(52) U.S. Cl.
CPC ........ *G06F 40/216* (2020.01); *G06F 16/3335* (2019.01); *G06F 16/38* (2019.01); *G06F 18/22* (2023.01); *G06F 40/226* (2020.01)

(58) Field of Classification Search
CPC .......... G06F 9/54; G06F 16/215; G06F 40/12; G06F 40/20; G06F 40/279; H04L 65/102; H04L 65/1043; H04L 67/133
(Continued)

(56) References Cited

U.S. PATENT DOCUMENTS

| 10,757,139 | B1 * | 8/2020 | Cignetti | H04L 63/1433 |
| 2015/0350234 | A1 * | 12/2015 | Reno | H04L 67/02 726/25 |

(Continued)

FOREIGN PATENT DOCUMENTS

EP    3848797 A1 *  7/2021  ..........  G06F 11/3684

OTHER PUBLICATIONS

Suhuan et al., "Android Malware Detection Based on Logistic Regression and XGBoost", 2019 IEEE 10th International Conference on Software Engineering and Service Science (ICSESS), Oct. 18-20, 2019, pp. 528 to 532. (Year: 2019).*

(Continued)

*Primary Examiner* — Martin Lerner
(74) *Attorney, Agent, or Firm* — KDW Firm PLLC (57) ABSTRACT

Enforcing data ownership may include receiving a request to register an application programming interface (API) endpoint. A plurality of elements of the API endpoint and a target API endpoint may be preprocessed. A distance may be computed for each of element of the API endpoint relative to at least one of the elements of the target API endpoint. A distance score for the API endpoint may be computed based on the distance scores. A term frequency-inverse document frequency (TF-IDF) value may be computed for a plurality of metadata terms of the API endpoint and the target API endpoint. A similarity score between the TF-IDF values of the metadata terms may be computed. An adjusted score may be computed for the API endpoint based on the distance score and the similarity scores. The API endpoint may be registered based on the adjusted score being below a permissions threshold.

20 Claims, 7 Drawing Sheets

(51) Int. Cl.
*H04L 65/1043* (2022.01)
*G06F 40/216* (2020.01)
*G06F 40/226* (2020.01)
*G06F 16/38* (2019.01)
*G06F 16/33* (2019.01)
*G06F 18/22* (2023.01)

(58) Field of Classification Search
USPC .............................. 704/1, 9; 713/1; 719/328
See application file for complete search history.

(56) References Cited

U.S. PATENT DOCUMENTS

| | | | |
|---|---|---|---|
| 2018/0288190 A1* | 10/2018 | Lyons | G06F 11/3452 |
| 2018/0314622 A1* | 11/2018 | Lowe | G06F 11/3616 |
| 2019/0384856 A1* | 12/2019 | Liu | G06F 40/284 |
| 2020/0159592 A1* | 5/2020 | Hansmann | G06F 9/4881 |
| 2020/0326913 A1* | 10/2020 | Ying | G06F 9/54 |
| 2020/0334260 A1* | 10/2020 | Kussmaul | G06F 3/0486 |
| 2022/0012332 A1* | 1/2022 | Dürr | H04L 63/1458 |
| 2022/0109692 A1* | 4/2022 | Hebert | H04L 67/133 |
| 2022/0382723 A1* | 12/2022 | Rama | G06F 16/215 |

OTHER PUBLICATIONS

Li et al., "A Robust Malware Detection Approach for Android System Against Adversarial Example Attacks", 2019 IEEE 5th International Conference on Collaboration and Internet Computing (CIC), Dec. 12-14, 2019, pp. 360 to 365. (Year: 2019).*

Xue et al., "Malware Classification Using Probability Scoring and Machine Learning", IEEE Access, vol. 7, Jul. 9, 2019, pp. 91641 to 91656. (Year: 2019).*

Author Unknown, "Amazon API Gateway", Amazon.com [online]. Retrieved from Internet URL: <https://aws.amazon.com/api-gateway/>. Retrieved on Aug. 31, 2021, 33 pages.

Author Unknown, "Creating a REST API in Amazon API Gateway", Amazon.com [online], Retrieved from Internet URL: <https://docs.aws.amazon.com/apigateway/latest/developerguide/how-to-create-api.html>. Retrieved on Aug. 31, 2021, 3 pages.

* cited by examiner

```
302 ⟶ {
304 ⟶  "URLs": {
          "same": "http://example.com/articles",
          "next": "http://example.com/articles?page=2",
          "last": "http://example.com/articles?page=10"
       },
       "data": [{
          "type": "example",
          "id": "1",
          "attributes": {
306 ⟶      "title": "Example of API Endpoint Registration"
          },
          "relationships": {
           "creator": {
            "links": {
              "self": "http://example.com/articles/1/relationships/creator",
              "related": "http://example.com/articles/1/creator"
            },
            "data": { "type": "ppl", "id": "1" }
           },
308 ⟶    "metadata": {
            "links": {
             "self": "http://example.com/articles/1/metadata ",
             "related": "http://example.com/articles/1/metadata"
            },
          ....
       }]
       }
```

ENFORCING DATA OWNERSHIP AT GATEWAY REGISTRATION USING NATURAL LANGUAGE PROCESSING

BACKGROUND

Organizations may have application programming interfaces (APIs) that number in the hundreds, thousands, millions, or more. Verifying the integrity of each API leads to improved security, as malicious actors may attempt to deploy unauthorized APIs in a given domain. However, it may be difficult to distinguish legitimate APIs from malicious or otherwise unauthorized APIs. This problem is exacerbated as the number of APIs increases.

BRIEF SUMMARY

Systems, methods, computer program products, and apparatuses for enforcing data ownership for API registration using natural language processing. In one aspect, a method, includes receiving, by a processor of an application programming interface (API) gateway, a request to register an API endpoint with the API gateway, preprocessing, by the processor, a plurality of elements of the API endpoint and a plurality of elements of a target API endpoint, computing, by the processor, a distance for each of element of the API endpoint relative to the element of the target API endpoint, computing, by the processor based on the distances, a distance score for the API endpoint, computing, by the processor for each of a plurality of metadata terms of the API endpoint and for each of a plurality of metadata terms of the target API endpoint, a respective term frequency-inverse document frequency (TF-IDF) value, computing, by the processor, a similarity score between the TF-IDF values of the metadata terms of the API endpoint and the TF-IDF values of the metadata terms of the target API endpoint, computing, by the processor, an adjusted score for the API endpoint based on the distance score and the computed similarity scores, and registering the API endpoint by the processor based on the adjusted score being below a permissions threshold.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments disclosed herein provide techniques to securely verify application programming interface (API) endpoints in an API gateway using natural language processing techniques. Generally, an API endpoint may be identified by a uniform resource locator (URL) and may be defined by a configuration file specifying a configuration of the API endpoint. The configuration may include a plurality of key-value pair elements and any other types of elements. The API endpoint may further be associated with metadata that describes the API endpoint in natural language (e.g., "this API is related to user login."). When a request to register an API endpoint is received, a computing system may process the request. More specifically, the system may perform payload preprocessing on the configuration file of the API endpoint. The system may then perform payload scoring on the preprocessed configuration file. In one embodiment, the payload scoring may include computing distance values between each element of the API endpoint and the elements of one or more target API endpoints, where the target API endpoints are existing, verified API endpoints. The payload scoring may produce a score for the API endpoint.

The computing system may further process the metadata of the API endpoint relative to one or more of the target API endpoints. For example, the system may determine term frequencies in a corpus of metadata, where the corpus is related to a plurality of existing target API endpoints. The system may further compute term frequencies for the metadata of the API endpoint. The term frequencies may include term frequency-inverse document frequency (TF-IDF) values. Based on the TF-IDF values, the system may compute an adjuster, which may include, but is not limited to cosine similarity of the TF-IDF values, Jaccard distance of the TF-IDF values, and/or Euclidean distance of the TF-IDF values. An adjusted score may be computed based on the score of the payload and the adjuster, e.g., a product of the score of the payload and the adjuster. The system may compare the adjusted score to a predetermined threshold. If the adjusted score exceeds the threshold, the system may reject the request, and restrict the API endpoint from being added to the API gateway. If the score does not exceed the threshold, the system may approve the request and add the API endpoint to the API gateway. Doing so exposes one or more web services at the API endpoint to users.

Furthermore, in some embodiments, the adjusted score of the API endpoint may be used to identify existing API endpoints that are similar (and/or identical) to the API endpoint. For example, if the adjusted score is less than a similarity threshold, the system may determine that an existing API endpoint is a duplicate of the API endpoint (and/or are otherwise substantially similar). Doing so allows users to refrain from spending additional time and/or resources on the new API endpoint, as the existing API endpoint may be used or otherwise modified for a desired function.

Advantageously, embodiments disclosed herein securely verify API endpoints to be registered and/or deployed at an API gateway. Doing so preserves system security by ensuring that valid API endpoints are used in computing environments. Furthermore, doing so may prevent malicious actors from deploying malicious API endpoints in the computing environments. Further still, time and/or resources may be conserved by identifying similar and/or duplicate API endpoints.

With general reference to notations and nomenclature used herein, the detailed descriptions herein may be presented in terms of program procedures executed on a computer or network of computers. These procedural descriptions and representations are used by those skilled in the art to convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Various embodiments also relate to apparatus or systems for performing these operations. This apparatus may be specially constructed for the required purpose or it may comprise a computer as selectively activated or reconfigured by a computer program stored in the computer. The procedures presented herein are not inherently related to a particular computer or other apparatus. Various machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 622 illustrated as components 622-1 through 622-a may include components 622-1, 622-2, 622-3, 622-4, and 622-5. The embodiments are not limited in this context.

Figure 1:
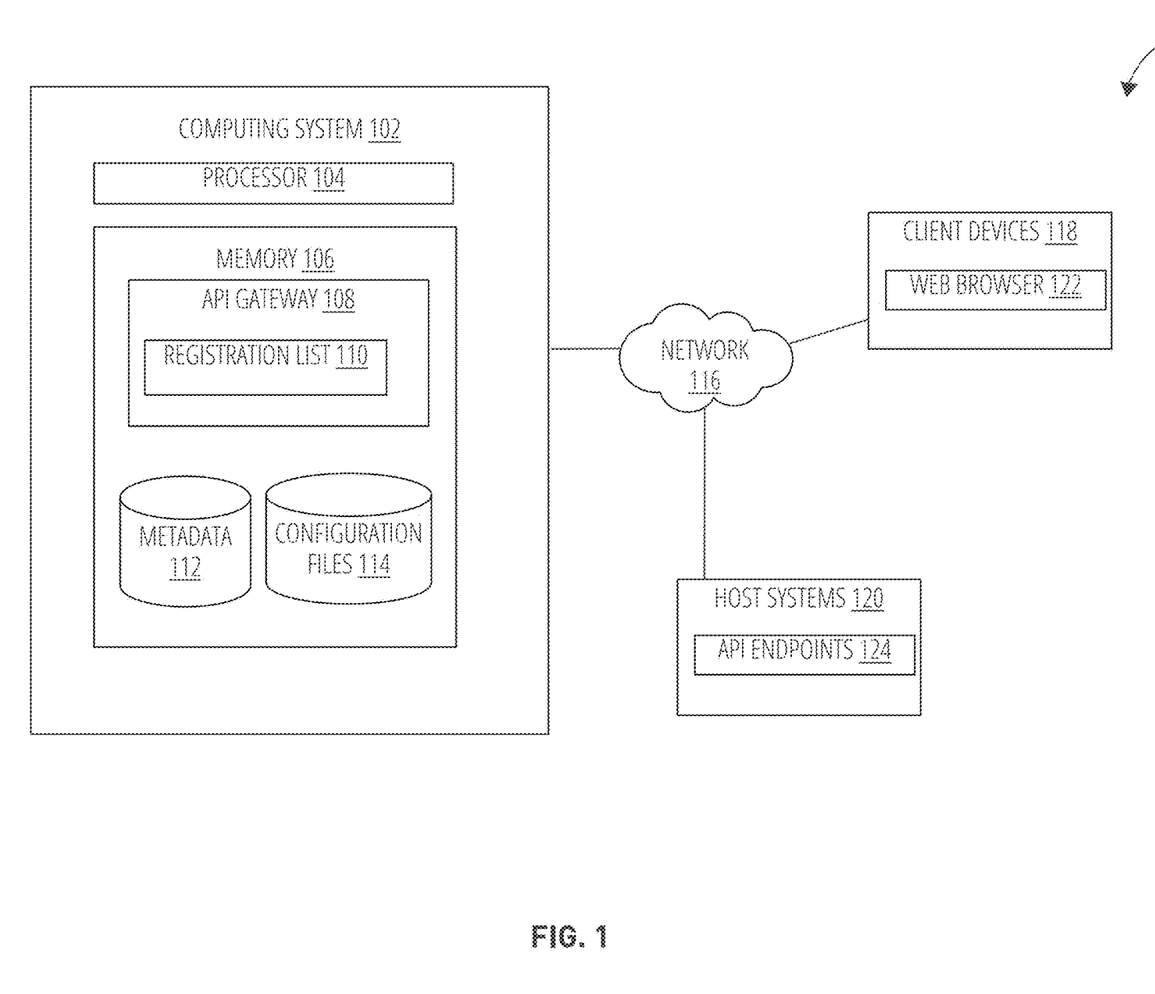
FIG. 1 illustrates an aspect of the subject matter in accordance with one embodiment.

FIG. 1 depicts a schematic of an exemplary system 100, consistent with disclosed embodiments. As shown, the system 100 comprises a computing system 102, one or more client devices 118, and one or more host systems 120 communicably coupled via a network 116. The computing system 102 includes at least a processor 104 and a memory 106. The client devices 118 and the host systems 120 similarly include at least one processor and a memory, which are not depicted for the sake of clarity. The computing system 102, host systems 120, and client devices 118 are representative of any type of computing system or device, such as a server, compute cluster, cloud computing environment, virtualized computing system, smartphone, laptop computer, desktop computer, and the like. The example configuration depicted in FIG. 1 should not be considered limiting of the disclosure, as other configurations are equally applicable to the disclosure. For example, the host systems 120 may be coupled to the computing system 102 via an intranet (not pictured) rather than via the network 116. In such a configuration, all requests received via the network 116 from the client devices 118 targeting the API endpoints 124 may be processed and/or routed through the API gateway 108 of the computing system 102 using the intranet. Similarly, all responses from the API endpoints 124 may be passed through the API gateway 108 via the intranet and returned to the client devices 118 via the network 116. Embodiments are not limited in these contexts.

As shown, the memory 106 of the computing system 102 includes an API gateway 108, a registration list 110 reflecting active (or deployed API endpoints 124 on one or more host systems 120), a data store of metadata 112, and a data store of configuration files 114 for each of the API endpoints 124. The API gateway 108 is an API management tool that sits between a client (e.g., the client devices 118) and a collection of backend services (e.g., the API endpoints 124 of the host systems 120). The metadata 112 is representative of human-readable text that describes an API endpoint 124 (or any attribute thereof). For example, the metadata 112 may include purposes of an API endpoint 124, functions of an API endpoint 124, line of business (LOB) associated with the API endpoint 124, type information for fields (also referred to as elements), definitions of query parameters, descriptions for requests and/or responses, whether a given element is required, or any other type of metadata attribute of an API endpoint 124.

An API endpoint 124 is associated with one or more APIs, and may define the address or connection point to a web service (e.g., a URL string). The configuration files 114 are representative of any type of configuration file for an API and/or API endpoint 124. Examples of the configuration files 114 include, but are not limited to, JavaScript Object Notation (JSON) files, extensible markup language (XML) files, and gRPC remote procedure call (gRPC) files. The use of a particular file type as a reference example herein should not be considered limiting of the disclosure, as the disclosure is equally applicable to all types of configuration files 114. Furthermore, the disclosure is applicable to other contexts beyond API deployment, such as streaming data systems, event payloads, and/or any type of dataset.

The API gateway 108 may use natural language processing to process requests to deploy new API endpoints. For example, a developer may have a new API endpoint to be deployed in the system 100. The developer may submit a request to the API gateway 108 specifying a configuration file for the new API endpoint, a URL for the API endpoint, and metadata for the API endpoint. The API gateway 108 may use natural language processing to verify the integrity of the new API endpoint prior to deploying or otherwise permitting the new API endpoint to execute in the system 100.

Figure 2:
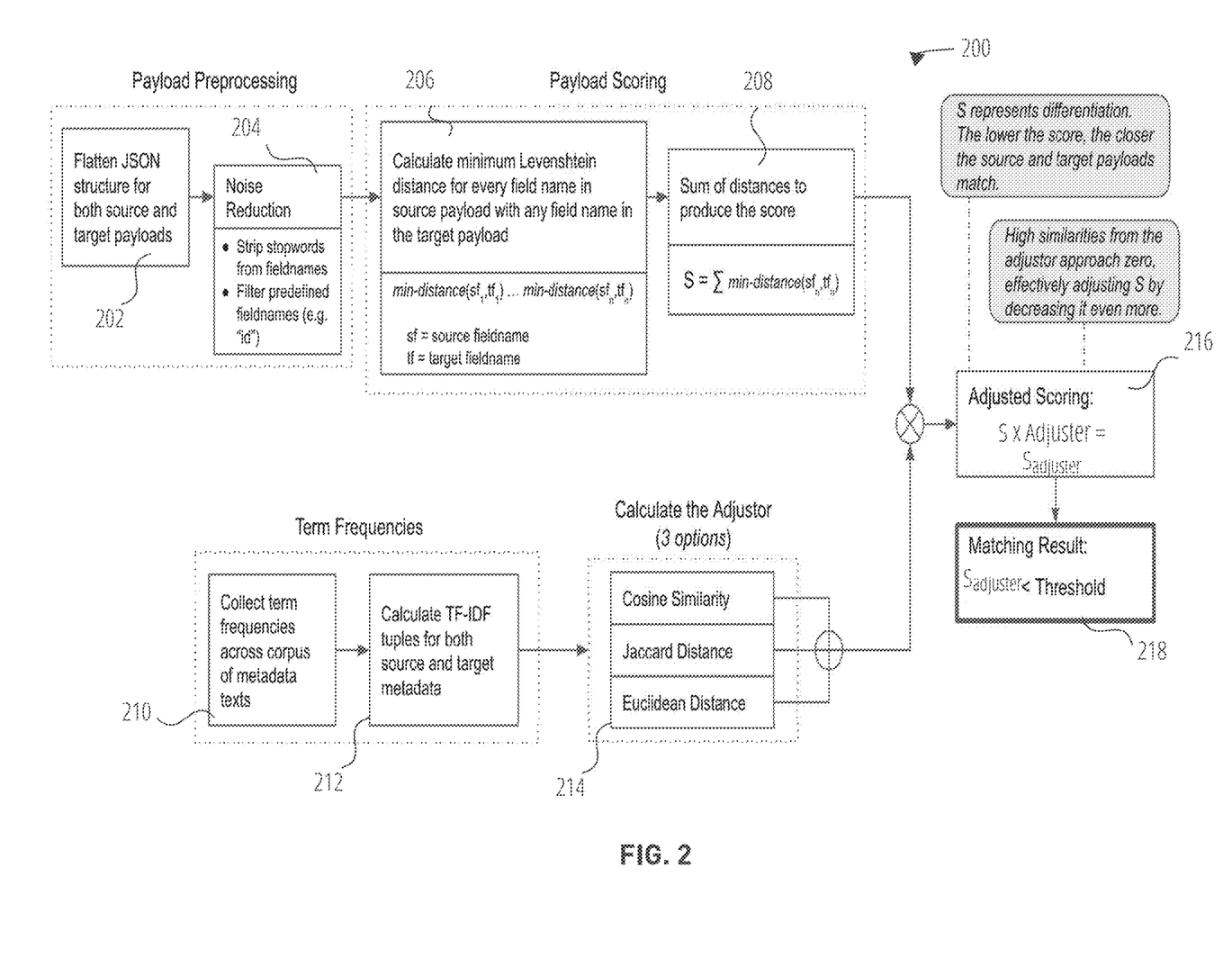
FIG. 2 illustrates an aspect of the subject matter in accordance with one embodiment.

FIG. 2 is a flow diagram 200 depicting example operations performed by the API gateway 108 to process a request to verify or otherwise deploy a new API endpoint. As shown, a payload preprocessing phase includes block 202, where the API gateway 108 may flatten the file structure of a configuration file for the new API endpoint (e.g., the new API endpoint submitted by a developer). Similarly, the API gateway 108 may flatten the file structure of one or more configuration files 114 of one or more existing, or target, API endpoints 124. At block 204, the API gateway 108 may perform noise reduction on the configuration files for the new API endpoint and the target API endpoints 124. For example, the API gateway 108 may remove predetermined stopwords from the configuration files (e.g., "and," "the," etc.), filter predetermined fieldnames (e.g., "ID," "identifier," etc.). Doing so may remove more common terms from the configuration files 114 of the target API endpoints 124 and the new API endpoint, which may reduce collisions that do not provide any meaningful insight into the analysis (e.g., identifying the term "ID" in the configuration for the new API endpoint as well as the target API endpoints 124).

After preprocessing, the API gateway 108 may perform payload scoring at block 206 and block 208. At block 206, the API gateway 108 may compute a distance between every field (or element) name in the configuration file for the new API endpoint and every field (or element) name in the configuration files 114 for the target API endpoints 124. In some embodiments, the distance between two elements is a minimum Levenshtein distance. A Levenshtein distance between two words is the minimum number of single-character edits (insertions, deletions, and/or substitutions) required to change one word into the other (e.g., to change "fname" in the configuration of the new API endpoint to "firstname" in a configuration file 114 for a target API endpoint 124). Therefore, if the configuration for the new API endpoint includes 150 elements, the API gateway 108 may compute the Levenshtein distance for each of the 150 elements relative to one or more elements of the configuration files 114 of the target API endpoints 124. At block 208, the API gateway 108 computes a sum of each of the distances computed at block 206. Doing so may produce a distance score between the new API endpoint and the target API endpoint 124. Generally, a lower distance score indicates a closer match between the configuration of the new API endpoint and the target API endpoint.

The API gateway 108 may further process the metadata of the new API endpoint and the metadata 112 for the plurality of target API endpoints 124. As shown, at block 210, the API gateway 108 may determine term frequencies for each term in the metadata 112. The API gateway 108 may further compute term frequencies for the metadata describing the new API endpoint. At block 212, the API gateway 108 may compute TF-IDF values for each of the terms in the metadata 112 and each of the metadata terms of the new API endpoint. Doing so may produce a vector of TF-IDF values for a given API endpoint 124 and a vector of TF-IDF values for the new API endpoint. At block 214, the API gateway 108 may compute an adjuster, which may be one or more of a cosine similarity, Jaccard distance, and/or a Euclidean distance between the vectors of TF-IDF values (and/or between each element of each vector). The cosine similarity may measure the similarity between the TF-IDF vectors in terms of angle in a vector space, while the Euclidean distance may measure the similarity between the TF-IDF vectors in terms of magnitude. The Jaccard distance may be based on subtracting the Jaccard index (which may be the size of the intersection of the vectors divided by the size of the union of the vectors) from 1. In some embodiments, the API gateway 108 may normalize the TF-IDF values (e.g., to a scale from 0.0-1.0) prior to computing the adjuster. Similarly, the API gateway 108 may normalize the adjuster in some embodiments. Generally, high similarities from the adjuster approach a value of zero, which may further decrease the distance score.

At block 216, the API gateway 108 may compute an adjusted score for the new API endpoint. The adjusted score may be based on a product of the distance score computed at block 208 and the adjuster computed at block 214. At block 218, the API gateway 108 may compare the adjusted score to one or more predetermined thresholds. For example, a permissions threshold may be a value of 0.5 on a scale from 0.0-1.0. If the adjusted score is 0.4, and therefore less than the permissions threshold, the API gateway 108 may permit the requested deployment of the new API endpoint 124. Doing so may include storing an indication of the new API endpoint in the registration list 110 (e.g., storing a URL for the new API endpoint), updating the metadata 112 to include metadata describing the new API endpoint, and storing the configuration file for the new API endpoint in the configuration files 114. Furthermore, the new API endpoint may be deployed as an API endpoint 124 on one or more host systems 120, thereby exposing the new API endpoint 124 and any associated web services to one or more client devices 118. For example, a user may access the new API endpoint 124 via a web browser 122 or other application on a client device 118.

If, however, the adjusted score exceeds the permissions threshold, the API gateway 108 may reject the new API endpoint to preserve system security. For example, a high adjusted score may indicate that the new API endpoint is too dissimilar to other API endpoints 124 in the system 100, and therefore may be indicative of a malicious API. However, in such embodiments, the API gateway 108 may notify a system administrator of the rejection of the new API endpoint, who may further review the new API endpoint, and approve and/or deny the request to deploy the new API endpoint.

In some embodiments, the API gateway 108 may be configured to identify API endpoints 124 that are very similar and/or duplicate versions of the new API endpoint. For example, a predetermined similarity threshold may be specified by the API gateway 108. If the adjusted score is below the similarity threshold, the API gateway 108 may determine that the new API endpoint and the target API endpoint 124 which was the basis of the scoring are duplicates and/or substantially similar. In some embodiments, the similarity threshold is less than the permissions threshold. In other embodiments, the permissions threshold and the similarity threshold are equal. The API gateway 108 may then inform the user that the target API endpoint 124 is similar to the new API endpoint 124. Doing so may allow the user to refrain from expending further time and/or resources in developing or otherwise deploying the new API endpoint. Furthermore, doing so improves the performance of the system 100 by limiting the number of API endpoints 124 that perform the same or similar functions, as having duplicate API endpoints 124 may cause performance issues in the system 100.

The API gateway 108 may perform the flow 200 for each of the target (or existing) API endpoints 124 and/or a subset thereof. For example, the API gateway 108 may process the new API endpoint relative to each existing API endpoint 124, which may produce a plurality of adjusted scores. In such an embodiment, the API gateway 108 may compute an average of the adjusted scores, and compare the average adjusted score to the threshold. However, each adjusted score may be compared to the similarity threshold (without being averaged) to determine one or more existing API endpoints 124 that are duplicates and/or substantially similar to the new API endpoint 124. In some embodiments, the API gateway 108 may display or return the top n-most similar existing API endpoints 124 (e.g., the n API endpoints 124 that have the lowest similarity scores relative to the new API endpoint, where "n" is any positive integer).

The permissions threshold and/or the similarity threshold may be any suitable value and may be defined based on any number of heuristics. For example, a plurality of different lines of business may use different permissions thresholds and/or similarity thresholds. Furthermore, the thresholds may be based on different types of structured metadata fields. Embodiments are not limited in these contexts.

Figure 3:
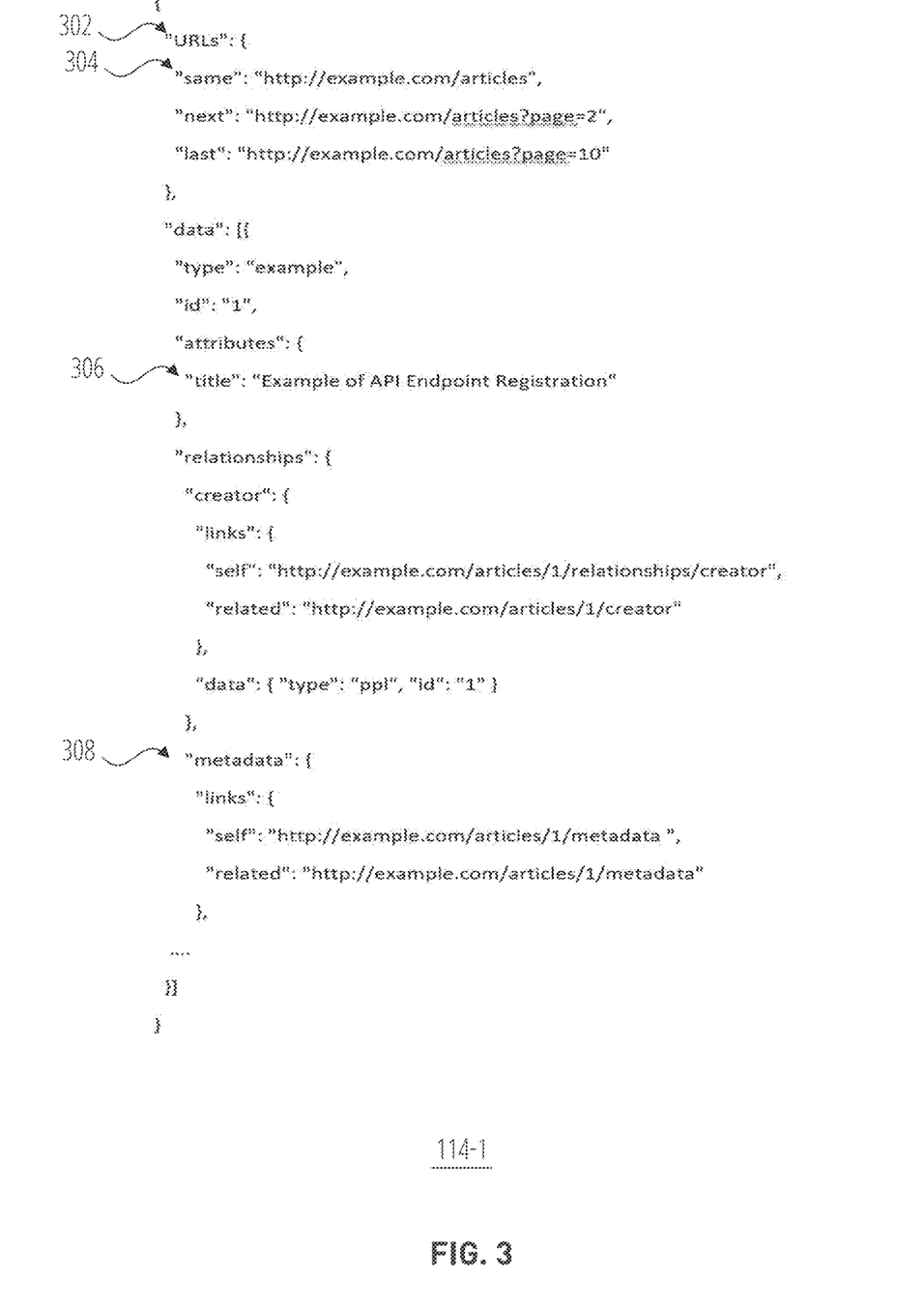
FIG. 3 illustrates an aspect of the subject matter in accordance with one embodiment.

FIG. 3 illustrates a portion of an example configuration file 114-1. As shown, the example configuration file 114-1 includes an element 302, an element 304, an element 306, and an element 308. The element 302 may correspond to a URL data element, which may include a "same" element 304 and corresponding value "http://example.com/articles". Therefore, element 304 is a key/value pair. Element 306 includes a key/value pair for a title of a different data element. Element 308 may correspond to a metadata element, which may include one or more URLs to the metadata 112 of the configuration file 114-1. Embodiments are not limited in this context.

As stated, the configuration files 114 may include a plurality of different elements, which may include, but are not limited to, type information, query parameters, types of requests, types of responses, whether an element is a required element, request bodies, response bodies, any data that may be present in a hypertext transfer protocol (HTTP) request from the client to a server, any data present in an HTTP response from the server to the client, structured metadata, and the like. Therefore, all items in quotation marks in FIG. 3 may be analyzed by the API gateway 108 to produce a distance score for a new API endpoint 124 relative to an existing API endpoint 124.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 4:
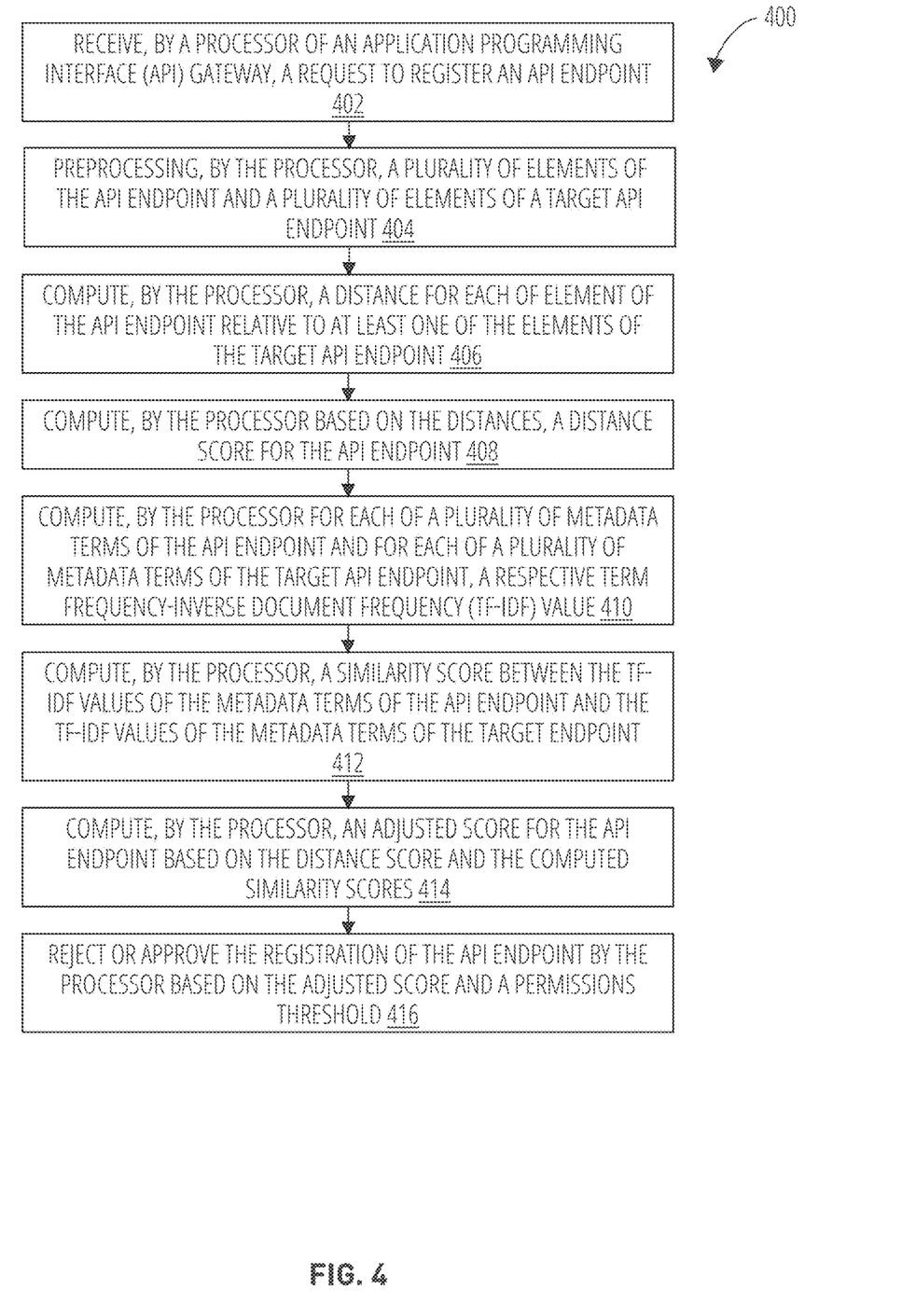
FIG. 4 illustrates a routine in accordance with one embodiment.

FIG. 4 illustrates an embodiment of a logic flow, or routine, 400. The logic flow 400 may be representative of some or all of the operations executed by one or more embodiments described herein. For example, the logic flow 400 may include some or all of the operations for enforcing data ownership for API registration using natural language processing. Embodiments are not limited in this context.

In block 402, routine 400 receives, by a processor of an application programming interface (API) gateway, a request to deploy, verify, register, or otherwise process a new API endpoint. The request may include indications of a URL for the new API endpoint, a configuration file for the new API endpoint, and metadata for the API endpoint. In block 404, routine 400 preprocesses, by the processor, a plurality of elements of the API endpoint and a plurality of elements of one or more target API endpoints 124. The plurality of elements may include, but are not limited to, key/value pairs, data types, a body of an API request, a body of an API response, header information, query parameters, and any other element of an API. In block 406, routine 400 computes, by the processor, a distance for each of element of the API endpoint relative to at least one of the elements of the target API endpoint. For example, a distance between a key name in a query parameter in the new API endpoint may be computed relative to a key name for a query parameter in the target API endpoint. In block 408, routine 400 computes, by the processor based on the distances, a distance score for the new API endpoint.

In block 410, routine 400 computes, by the processor for each of a plurality of metadata terms of the new API endpoint and for each of a plurality of metadata terms of the target API endpoint 124, a respective term frequency-inverse document frequency (TF-IDF) value. Doing so may produce a vector of TF-IDF values for the new API endpoint and a vector of TF-IDF values for the target API endpoint 124. In block 412, routine 400 computes, by the processor, a similarity score between the TF-IDF values of the metadata terms of the new API endpoint and the TF-IDF values of the metadata terms of the target API endpoint 124. For example, the similarity score may include a cosine similarity, Jaccard distance, and/or a Euclidean distance between the vectors of TF-IDF values (and/or between each element of each vector). In some embodiments, the processor may further normalize the TF-IDF values. In block 414, routine 400 computes, by the processor, an adjusted score for the new API endpoint based on the distance score and the similarity scores. In one embodiment, the adjusted score is computed based on a product of the distance score and the similarity score.

In block 416, routine 400 rejects the requested deployment of the API endpoint by the processor based on the adjusted score exceeding a permissions threshold. For example, the processor may compare the adjusted score to the permissions threshold, and reject the deployment of the new API endpoint based on the adjusted score exceeding the threshold. If, however, the score is below the threshold, the API gateway 108 may store an indication of the new API endpoint in the registration list 110, update the metadata 112 to include metadata describing the new API endpoint, and store the configuration file for the new API endpoint in the configuration files 114. Furthermore, the new API endpoint may be deployed as an API endpoint 124 on one or more host systems 120, thereby exposing the new API endpoint 124 and any associated web services to one or more client devices 118.

The routine 400 may be performed multiple times, e.g., to compare the new API endpoint to multiple API endpoints 124. Doing so may allow the processor to determine which, if any, target API endpoint 124 are most similar to the new API endpoint. Furthermore, doing so considers all existing API endpoints 124 in the system 100, thereby allowing the adjusted score to reflect the similarity of the new API endpoint to all existing API endpoints 124, which enhances system security. As stated, when multiple target API endpoints 124 are processed, the API gateway 108 may compute an average of the adjusted scores, and compare the adjusted score to the permissions threshold. However, each individual adjusted score may be compared to the similarity threshold, to allow the API gateway 108 to determine which existing API endpoints 124 are most similar to the new API endpoint.

Figure 5:
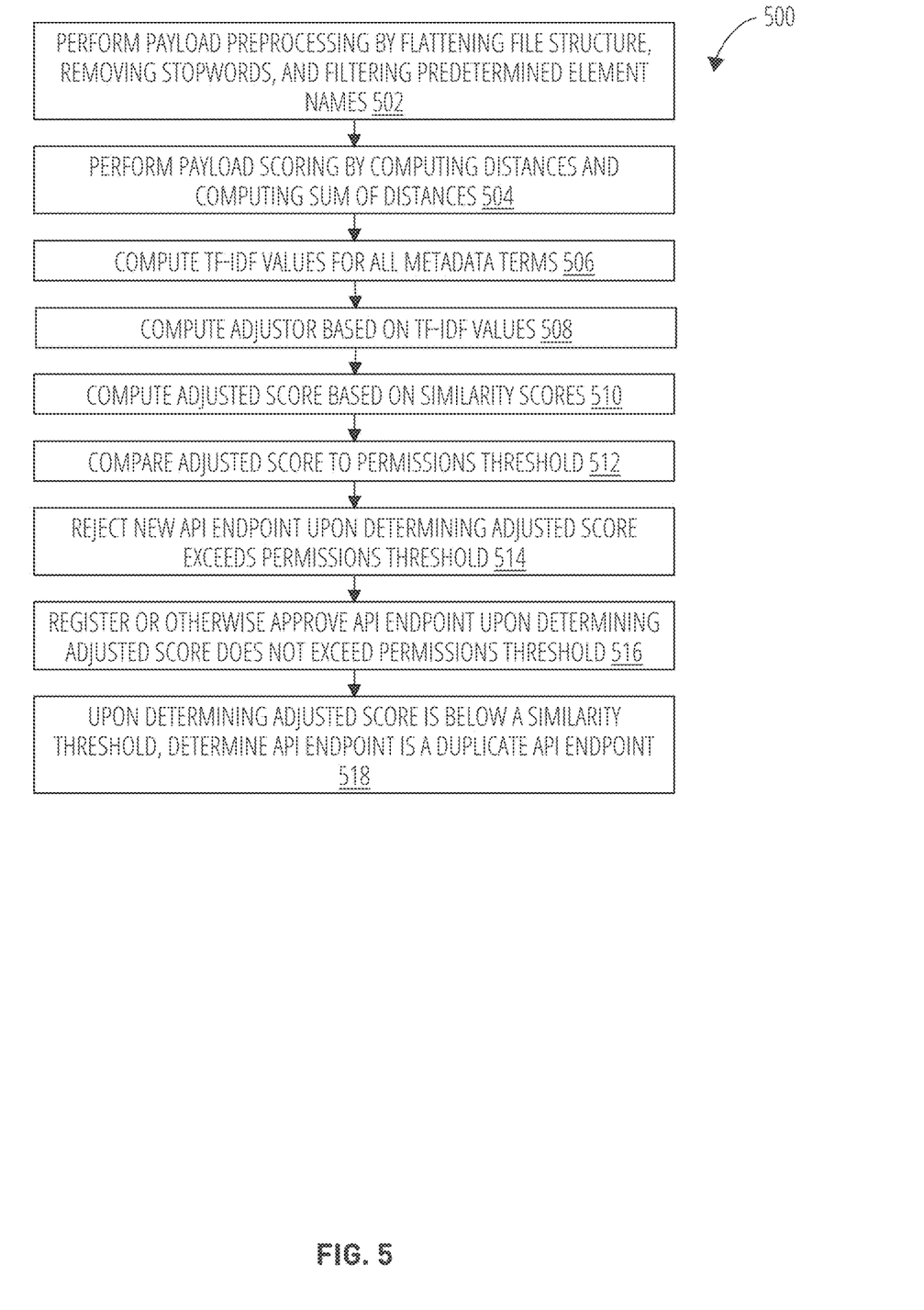
FIG. 5 illustrates a routine in accordance with one embodiment.

FIG. 5 illustrates an embodiment of a logic flow, or routine, 500. The logic flow 500 may be representative of some or all of the operations executed by one or more embodiments described herein. For example, the logic flow 500 may include some or all of the operations for enforcing data ownership for API registration using natural language processing. Embodiments are not limited in this context.

In block 502, routine 500 includes the API gateway 108 performing payload preprocessing by flattening file structure, removing stopwords, and filtering predetermined element names from a configuration of a new API endpoint and a target API endpoint 124. In block 504, routine 500 includes the API gateway 108 performing payload scoring by computing distances between the terms in the configuration of the new API endpoint and the configuration file 114 of the target API endpoint 124. Furthermore, the API gateway 108 may compute a sum of the computed distances to produce a distance score for the new API endpoint relative to the target API endpoint 124. In block 506, routine 500 includes the API gateway 108 computing TF-IDF values for all metadata terms in the metadata of the new API endpoint and the target API endpoint 124. In block 508, routine 500 includes the API gateway 108 computing an adjuster based on the TF-IDF values.

In block 510, routine 500 includes the API gateway 108 computing an adjusted score based on distance score and the adjuster. In block 512, routine 500 includes the API gateway 108 comparing the adjusted score to a threshold. In block 514, routine 500 rejects the new API endpoint upon determining the adjusted score exceeds a permissions threshold. In block 516, routine 500 includes the API gateway 108 deploying the new API endpoint upon determining the adjusted score does not exceed the permissions threshold. In block 518, routine 500 includes the API gateway 108 determining the new API endpoint is a duplicate API endpoint based upon determining the adjusted score is below a similarity threshold. Doing so causes the API gateway 108 to return an indication that the target API endpoint 124 and the new API endpoint 124 may be duplicates and/or are similar.

The routine 500 may be performed multiple times, e.g., for each of the target (or existing) API endpoints 124 and/or a subset thereof. For example, the API gateway 108 may process the new API endpoint relative to each existing API endpoint 124, which may produce a plurality of adjusted scores. In such an embodiment, the API gateway 108 may compute an average of the adjusted scores, and compare the average adjusted score to the threshold. However, each adjusted score may be compared to the similarity threshold (without being averaged) to determine one or more existing API endpoints 124 that are duplicates and/or substantially similar to the new API endpoint 124 at block 518. In some embodiments, the API gateway 108 may display or return the top n-most similar existing API endpoints 124 (e.g., the n API endpoints 124 that have the lowest similarity scores relative to the new API endpoint, where "n" is any positive integer).

Figure 6:
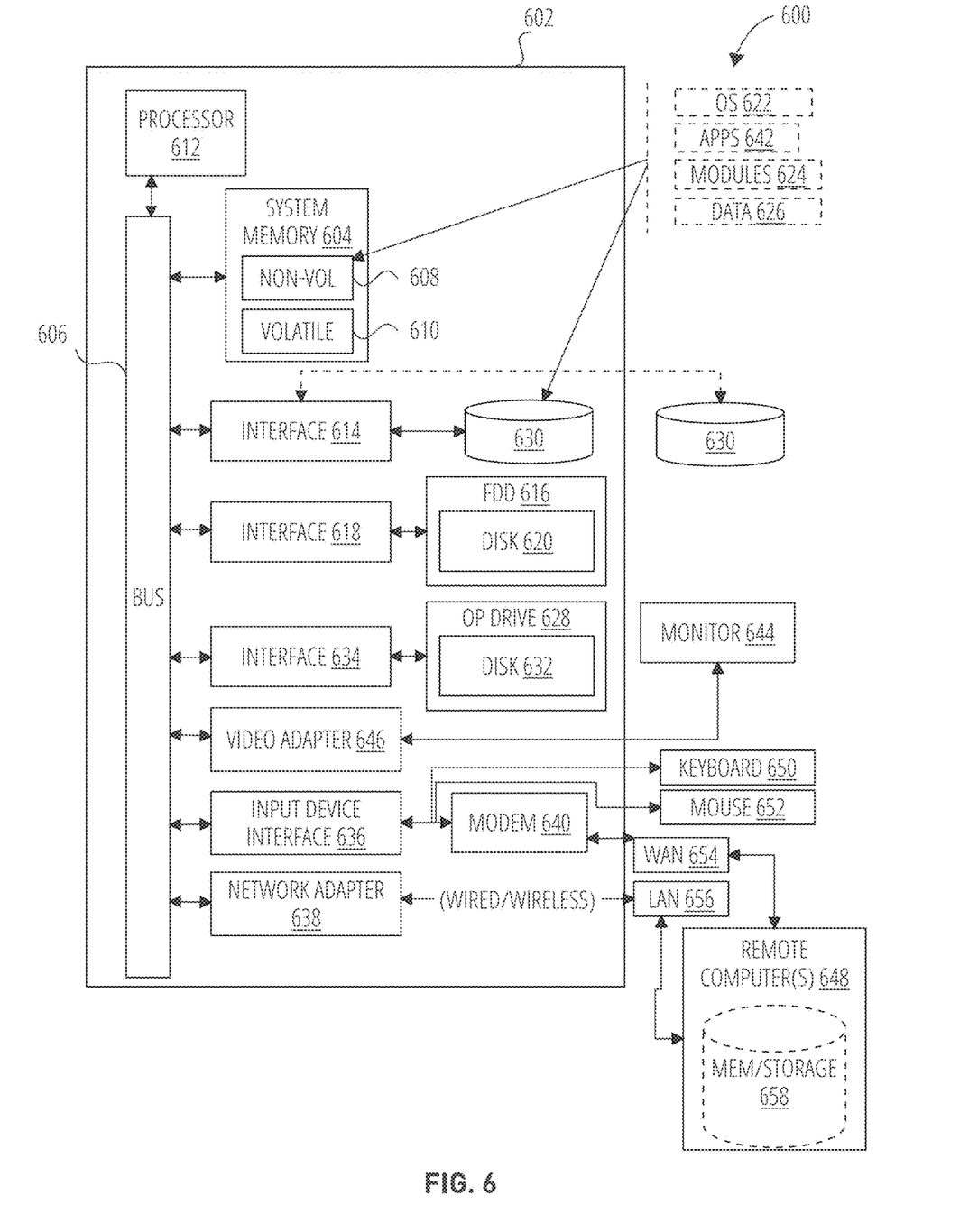
FIG. 6 illustrates a computer architecture in accordance with one embodiment.

FIG. 6 illustrates an embodiment of an exemplary computer architecture 600 suitable for implementing various embodiments as previously described. In one embodiment, the computer architecture 600 may include or be implemented as part of system 100. The computer architecture 600 may implement all features, methods, systems, logic, apparatuses, and/or operations described herein with reference to FIGS. 1-5.

As used in this application, the terms "system" and "component" are intended to refer to a computer-related entity, either hardware, a combination of hardware and software, software, or software in execution, examples of which are provided by the exemplary computing computer architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computer architecture 600.

As shown in FIG. 6, the computer architecture 600 includes a processor 612, a system memory 604 and a system bus 606. The processor 612 can be any of various commercially available processors.

The system bus 606 provides an interface for system components including, but not limited to, the system memory 604 to the processor 612. The system bus 606 can be any of several types of bus structure that may further interconnect to a memory bus (with or without a memory controller), a peripheral bus, and a local bus using any of a variety of commercially available bus architectures. Interface adapters may connect to the system bus 606 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 604 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 604 can include non-volatile 608 and/or volatile 610. A basic input/output system (BIOS) can be stored in the non-volatile 608.

The computer 602 may include various types of computer-readable storage media in the form of one or more lower speed memory units, including an internal (or external) hard disk drive 630, a magnetic disk drive 616 to read from or write to a removable magnetic disk 620, and an optical disk drive 628 to read from or write to a removable optical disk 632 (e.g., a CD-ROM or DVD). The hard disk drive 630, magnetic disk drive 616 and optical disk drive 628 can be connected to system bus 606 by an HDD interface 614, and FDD interface 618 and an optical disk drive interface 634, respectively. The HDD interface 614 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 608, and volatile 610, including an operating system 622, one or more applications 642, other program modules 624, and program data 626. In one embodiment, the one or more applications 642, other program modules 624, and program data 626 can include, for example, the various applications and/or components of the system 100.

A user can enter commands and information into the computer 602 through one or more wire/wireless input devices, for example, a keyboard 650 and a pointing device, such as a mouse 652. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 612 through an input device interface 636 that is coupled to the system bus 606 but can be connected by other interfaces such as a parallel port, IEEE 1394 serial port, a game port, a USB port, an IR interface, and so forth.

A monitor 644 or other type of display device is also connected to the system bus 606 via an interface, such as a video adapter 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory and/or storage device 658 is illustrated. The logical connections depicted include wire/wireless connectivity to a local area network 656 and/or larger networks, for example, a wide area network 654. Such LAN and WAN networking environments are commonplace in offices and companies, and facilitate enterprise-wide computer networks, such as intranets, all of which may connect to a global communications network, for example, the Internet.

When used in a local area network 656 networking environment, the computer 602 is connected to the local area network 656 through a wire and/or wireless communication network interface or network adapter 638. The network adapter 638 can facilitate wire and/or wireless communications to the local area network 656, which may also include a wireless access point disposed thereon for communicating with the wireless functionality of the network adapter 638.

When used in a wide area network 654 networking environment, the computer 602 can include a modem 640, or is connected to a communications server on the wide area network 654 or has other means for establishing communications over the wide area network 654, such as by way of the Internet. The modem 640, which can be internal or external and a wire and/or wireless device, connects to the system bus 606 via the input device interface 636. In a networked environment, program modules depicted relative to the computer 602, or portions thereof, can be stored in the remote memory and/or storage device 658. It will be appreciated that the network connections shown are exemplary and other means of establishing a communications link between the computers can be used.

The computer 602 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi® (or Wireless Fidelity), WiMax®, and Bluetooth® wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
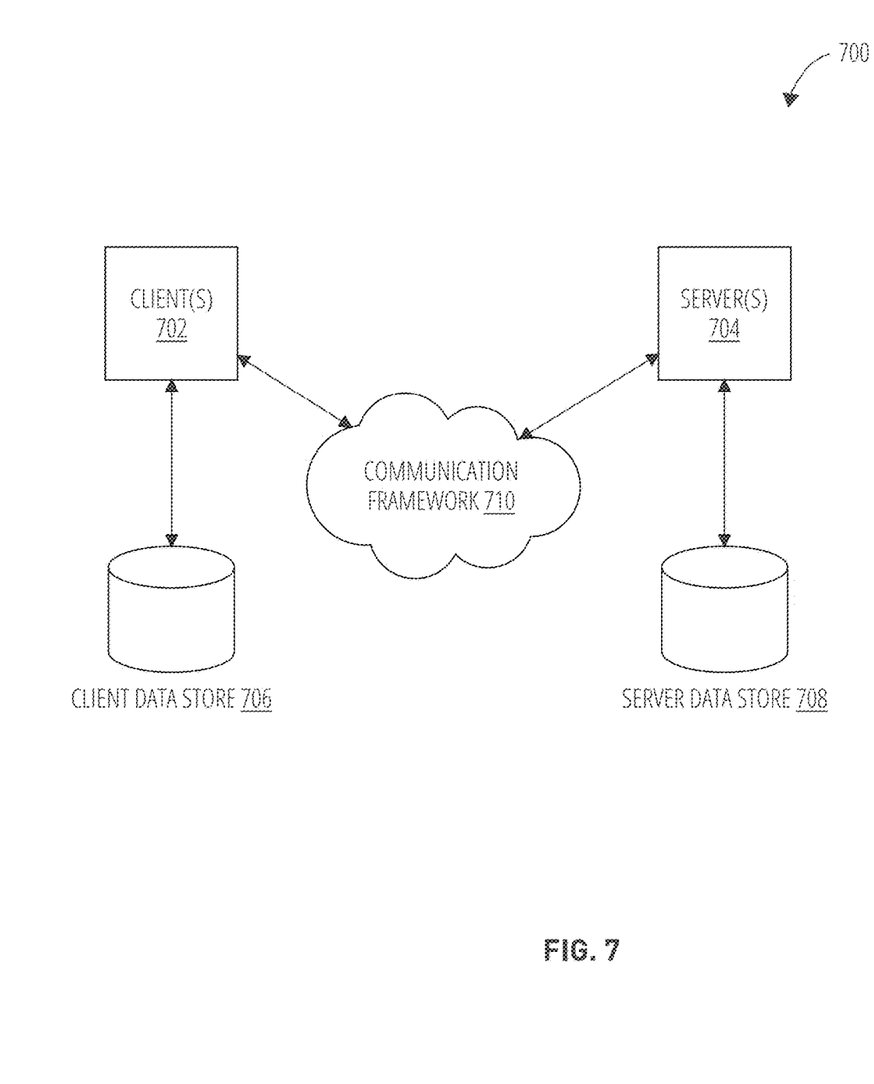
FIG. 7 illustrates a communications architecture in accordance with one embodiment.

FIG. 7 is a block diagram depicting an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700, which may be consistent with system 100.

As shown in FIG. 7, the communications architecture 700 includes one or more client(s) 702 and server(s) 704. The server(s) 704 may implement one or more devices of system 100. The client(s) 702 and the server(s) 704 are operatively connected to one or more respective client data store 706 and server data store 708 that can be employed to store information local to the respective client(s) 702 and server(s) 704, such as cookies and/or associated contextual information.

The client(s) 702 and the server(s) 704 may communicate information between each other using a communication framework 710. The communication framework 710 may implement any well-known communications techniques and protocols. The communication framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/600/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 702 and the server(s) 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
    receiving, by a processor of an application programming interface (API) gateway, a request to register an API endpoint with the API gateway;
    preprocessing, by the processor, a plurality of elements of the API endpoint and a plurality of elements of a target API endpoint;
    computing, by the processor, a distance for each of element of the API endpoint relative to at least one of the elements of the target API endpoint;
    computing, by the processor based on the distances, a distance score for the API endpoint;
    computing, by the processor for each of a plurality of metadata terms of the API endpoint and for each of a plurality of metadata terms of the target API endpoint, a respective term frequency-inverse document frequency (TF-IDF) value;
    computing, by the processor, a similarity score between the TF-IDF values of the plurality of metadata terms of the API endpoint and the TF-IDF values of the plurality of metadata terms of the target API endpoint;
    computing, by the processor, an adjusted score for the API endpoint based on the distance score and the similarity scores; and
    registering, by the processor, the API endpoint based on the adjusted score being below a permissions threshold.

2. The method of claim 1, further comprising:
    determining, by the processor, the adjusted score is below a similarity threshold, wherein the similarity threshold is less than the permission threshold; and
    outputting, by the processor, an indication specifying the API endpoint is a duplicate of the target API endpoint.

3. The method of claim 1, wherein the plurality of elements of the API endpoint are specified in a configuration file for the API endpoint, wherein the plurality of elements of the target API endpoint are specified in a configuration file for the target API endpoint, wherein registering the API endpoint comprises storing an indication that the API endpoint is accessible and providing access to the API endpoint.

4. The method of claim 1, wherein the preprocessing comprises:
    removing, by the processor, predetermined stopwords from the plurality of elements of the API endpoint and the plurality of elements of the target API endpoint; and
    removing, by the processor, predetermined elements from the plurality of elements of the API endpoint and the plurality of elements of the target API endpoint.

5. The method of claim 1, further comprising:
    receiving, by the processor, a second request to register a second API endpoint;
    preprocessing, by the processor, a plurality of elements of the second API endpoint;
    computing, by the processor, a distance for each of element of the second API endpoint relative to at least one of the elements of the target API endpoint;
    computing, by the processor by the processor based on the distances, a distance score for the second API endpoint;
    computing, by the processor for each of a plurality of metadata terms of the second API endpoint and each of the plurality of metadata terms of the target API endpoint, a respective TF-IDF value;
    computing, by the processor, a similarity score between the TF-IDF values of the plurality of metadata terms of the second API endpoint and the TF-IDF values of the plurality of metadata terms of the target API endpoint;
    computing, by the processor, an adjusted score for the second API endpoint based on the distance score and the similarity scores; and
    rejecting, by the processor, the second request to register the second API endpoint based on the adjusted score exceeding the permissions threshold.

6. The method of claim 1, wherein the similarity scores are based on one or more of: (i) a cosine similarity, (ii) a Jaccard distance, or (iii) a Euclidean distance, wherein the distance score is based on a sum of the distances for each of element of the API endpoint relative to the at least one of the elements of the target API endpoint, wherein the distances comprise Levenshtein distances.

7. The method of claim 1, further comprising:
    normalizing, by the processor, the similarity scores prior to computing the adjusted score, wherein the adjusted score is based on a product of the normalized similarity scores and the distance score.

8. A non-transitory computer-readable storage medium, the computer-readable storage medium including instructions that when executed by a processor of an application programming interface (API) gateway, cause the processor to:
    receive a request to register an API endpoint with the API gateway;
    preprocess a plurality of elements of the API endpoint and a plurality of elements of a target API endpoint;
    compute a distance for each of element of the API endpoint relative to at least one of the elements of the target API endpoint;
    compute, based on the distances, a distance score for the API endpoint;
    compute, for each of a plurality of metadata terms of the API endpoint and each of a plurality of metadata terms of the target API endpoint, a respective term frequency-inverse document frequency (TF-IDF) value;
    compute a similarity score between the TF-IDF values of the plurality of metadata terms of the API endpoint and the TF-IDF values of the plurality of metadata terms of the target API endpoint;
    compute an adjusted score for the API endpoint based on the distance score and the similarity scores; and
    register the API endpoint based on the adjusted score not exceeding a permissions threshold.

9. The computer-readable storage medium of claim 8, wherein the instructions further cause the processor to:
    determine the adjusted score is below a similarity threshold, wherein the similarity threshold is less than the permission threshold; and output an indication specifying the API endpoint is a duplicate of the target API endpoint.

10. The computer-readable storage medium of claim 8, wherein the plurality of elements of the API endpoint are specified in a configuration file for the API endpoint, wherein the plurality of elements of the target API endpoint are specified in a configuration file for the target API endpoint, wherein registering the API endpoint comprises storing an indication that the API endpoint is accessible and providing access to the API endpoint.

11. The computer-readable storage medium of claim 8, wherein the preprocessing comprises:
removing predetermined stopwords from the plurality of elements of the API endpoint and the plurality of elements of the target API endpoint; and
removing predetermined elements from the plurality of elements of the API endpoint and the plurality of elements of the target API endpoint.

12. The computer-readable storage medium of claim 8, wherein the instructions further cause the processor to:
receive a second request to register a second API endpoint;
preprocess a plurality of elements of the second API endpoint;
compute a distance for each of element of the second API endpoint relative to at least one of the elements of the target API endpoint;
compute, based on the distances, a distance score for the second API endpoint;
compute, for each of a plurality of metadata terms of the second API endpoint and each of the plurality of metadata terms of the target API endpoint, a respective TF-IDF value;
compute a similarity score between the TF-IDF values of the plurality of metadata terms of the second API endpoint and the TF-IDF values of the plurality of metadata terms of the target API endpoint;
compute an adjusted score for the second API endpoint based on the distance score and the similarity scores; and
restrict, by the API gateway, the registration of the second API endpoint based on the adjusted score exceeding the permissions threshold.

13. The computer-readable storage medium of claim 8, wherein the similarity scores are based on one or more of: (i) a cosine similarity, (ii) a Jaccard distance, or (iii) a Euclidean distance, wherein the distance score is based on a sum of the distances for each of element of the API endpoint relative to the at least one of the elements of the target API endpoint, wherein the distances comprise Levenshtein distances.

14. The computer-readable storage medium of claim 8, wherein the instructions further cause the processor to:
normalize the similarity scores prior to computing the adjusted score, wherein the adjusted score is based on a product of the normalized similarity scores and the distance score.

15. A computing apparatus, comprising:
a processor; and
a memory storing instructions that, when executed by the processor, configure the apparatus to:
receive a request to register an application programming interface (API) endpoint with an API gateway;
preprocess a plurality of elements of the API endpoint and a plurality of elements of a target API endpoint;
compute a distance for each of element of the API endpoint relative to at least one of the elements of the target API endpoint;
compute, based on the distances, a distance score for the API endpoint;
compute, for each of a plurality of metadata terms of the API endpoint and each of a plurality of metadata terms of the target API endpoint, a respective term frequency-inverse document frequency (TF-IDF) value;
compute a similarity score between the TF-IDF values of the plurality of metadata terms of the API endpoint and the TF-IDF values of the plurality of metadata terms of the target API endpoint;
compute an adjusted score for the API endpoint based on the distance score and the similarity scores; and
register the API endpoint based on the adjusted score not exceeding a permissions threshold.

16. The computing apparatus of claim 15, wherein the instructions further configure the apparatus to:
determine the adjusted score is below a similarity threshold, wherein the similarity threshold is less than the permission threshold; and
output an indication specifying the API endpoint is a duplicate of the target API endpoint.

17. The computing apparatus of claim 15, wherein the plurality of elements of the API endpoint are specified in a configuration file for the API endpoint, wherein the plurality of elements of the target API endpoint are specified in a configuration file for the target API endpoint, wherein registering the API endpoint comprises storing an indication that the API endpoint is accessible and providing access to the API endpoint.

18. The computing apparatus of claim 15, wherein the preprocessing comprises:
removing predetermined stopwords from the plurality of elements of the API endpoint and the plurality of elements of the target API endpoint; and
removing predetermined elements from the plurality of elements of the API endpoint and the plurality of elements of the target API endpoint.

19. The computing apparatus of claim 15, wherein the instructions further configure the apparatus to:
receive a second request to register a second API endpoint;
preprocess a plurality of elements of the second API endpoint;
compute a distance for each of element of the second API endpoint relative to at least one of the elements of the target API endpoint;
compute, based on the distances, a distance score for the second API endpoint;
compute, for each of a plurality of metadata terms of the second API endpoint and each of the plurality of metadata terms of the target API endpoint, a respective TF-IDF value;
compute a similarity score between the TF-IDF values of the plurality of metadata terms of the second API endpoint and the TF-IDF values of the plurality of metadata terms of the target API endpoint;
compute an adjusted score for the second API endpoint based on the distance score and the similarity scores; and
restrict the registration of the second API endpoint based on the adjusted score exceeding the permissions threshold.

20. The computing apparatus of claim 15, wherein the similarity scores are based on one or more of: (i) a cosine similarity, (ii) a Jaccard distance, or (iii) a Euclidean distance, wherein the distance score is based on a sum of the distances for each of element of the API endpoint relative to the at least one of the elements of the target API endpoint, wherein the distances comprise Levenshtein distances, wherein the instructions further configure the apparatus to:

normalize the similarity scores prior to computing the adjusted score, wherein the adjusted score is based on a product of the normalized similarity scores and the distance score.

\* \* \* \* \*